2,496,404

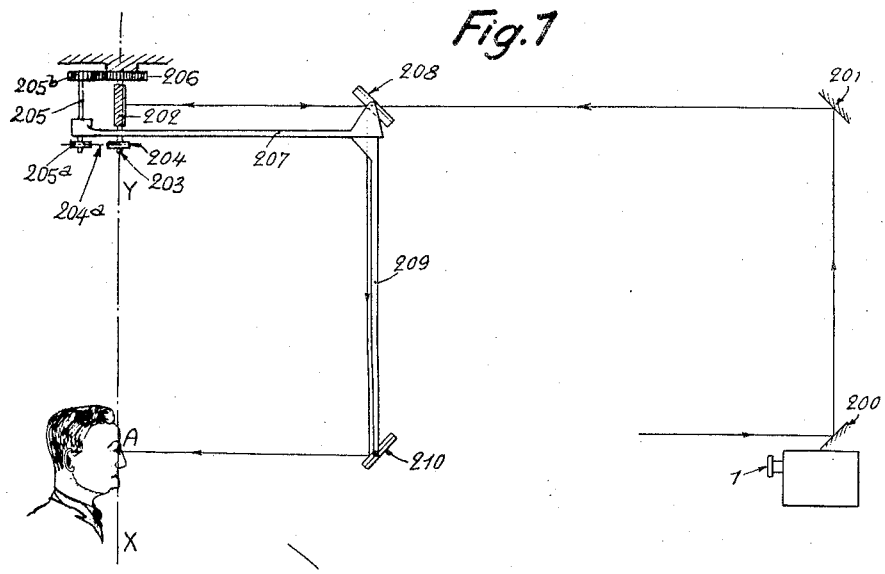
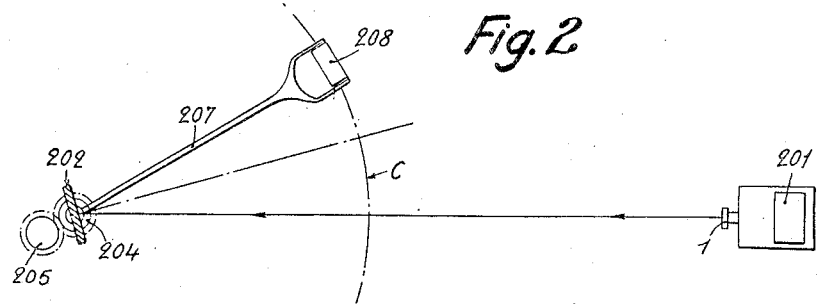
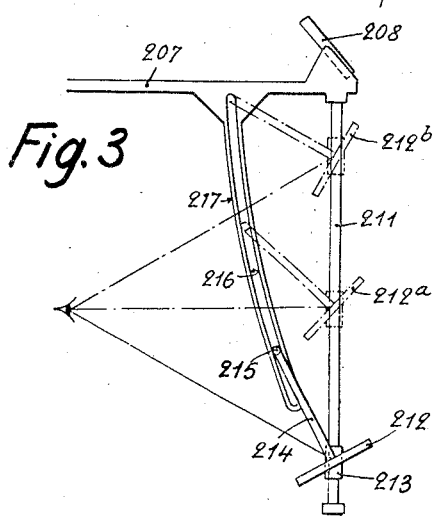
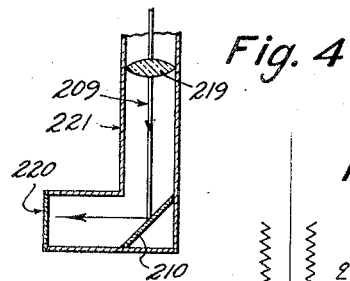
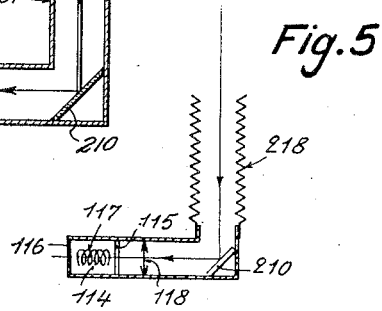
INVENTOR
JEAN MICHEL PAILLAIS
ALIAS FOUFOUNIS
BY Benedict & Swartwood
ATTORNEYS Patented Feb. 7, 1950

UNITED STATES PATENT OFFICE 2,496,404

SELF VIEW FINDER FOR PORTRAIT PHOTOGRAPHY

Jean Michel Paillais, alias Foufounis, Paris, France

Application January 19, 1946, Serial No. 642,260
In France March 3, 1945

12 Claims. (Cl. 88—74)

The invention has for an object a self-view-finder for the photography and motion-picture photography of portraits, by the help of which the user is able to photograph himself after having selected a suitable pose and judged of the ultimate result in the finder, which is intended to show an image identical or substantially identical to the image formed on the sensitive plate or film.

The self-view-finder may consist of an arrangement of reflecting surfaces giving a virtual image of the subject, or of reflecting surfaces combined with lenses providing a real image of the subject on a ground-glass screen. In all cases, the arrangement should be such that the image observed in the finder will show the user from the same angle (face, three-quarters, profile, overhead, etc.), as will ultimately appear on the portrait.

For this purpose it is in principle required that the objective lens of the finder should be the same as that of the camera and a retractable mirror can be arranged behind the camera objective lens, after the manner of conventional reflex cameras, this mirror being optionally associated with further reflecting surfaces and with lenses to reflect the image formed by the objective lens upon a ground-glass screen, in the event that a real image is to be obtained; for a virtual image, suitable lenses are associated with the objective lens to form a sort of telescope, giving an enlarged or a reduced image as may be desired.

However, the view-finder axis may be offset with respect to the optical axis of the camera, whenever the resulting parallax error is considered small enough for the user not to perceive any appreciable difference between the image exhibited by the finder and the resulting portrait picture.

A further object of the invention is to provide a single self-view-finder including movable elements which are suitably displaced and rotated for sighting at various angles, thus permitting the angle under which the user is seen from the objective lens of the camera to vary continuously. The feed of the film can be synchronized with the motion of the view-finder, whereby the pictures are taken automatically at the normal rate.

Instead of purely optical devices, consisting of reflecting surfaces and/or lenses, similar results can be obtained by introducing between the objective lens of the view-finder and the ocular (reflecting mirror or lens) an intermediate electric or electronic transmission means, by transforming the light energy into electrical energy, and changing this back into light energy.

The advantage of this method is that it lends itself to electrical amplification, providing an increased brightness of the image. This result is particularly desirable when the self-view-finder is so designed as to provide on a ground-glass screen a real image of the subject. The necessity of illuminating the latter in a relatively intense manner is such that the user may be more or less dazzled; in a general way, the image appearing on the ground glass may not be sufficiently bright for the user to get a clear appreciation of the result which will be ultimately obtained on the printed picture.

To provide for the amplification, the optical image of the subject, formed by means of the objective lens or of a suitable reflecting surface, must be transformed by any suitable means into electric current which, after amplification will be made to reconstruct through suitable means, an image identical with the first, though of greater intensity.

Among the various means which are available in the art for this purpose, use may be made in particular of an iconoscope and an oscillograph, as used in the television art or of devices operating by electronic refraction, as used in the electronic microscope and telescope.

In commercial embodiments of the invention, the apparatus can be associated with an additional coin-operated device which will normally lock the apparatus but will release same upon insertion through a slot of a coin or metal disc, bearing the name and address of the user for prompt delivery of the prints.

The installation can be completed by an automatic developing machine. Such devices, which are well known in the art, can be readily adapted to the present apparatus.

Further features of the invention will be made clear from the following description, referring to the accompanying drawing, which illustrates by way of example various embodiments of the invention, and in which:

Fig. 1 is a diagrammatical elevational view of a self-view-finder according to the invention;

Fig. 2 is a corresponding plan view;

Fig. 3 shows an elevational view of a vertically adjustable self-view-finder;

Fig. 4 is a view corresponding to a part of Fig. 1, showing a modification adapted to give a real image on a screen;

Fig. 5 shows the same device provided with an electronic amplifier for increasing the brightness of the image.

Referring to Figs. 1 and 2, A denotes the user's eye, and 1 denotes the camera lens. This lens is provided with a shutter actuating cable, terminating at a treadle or knob for operating the shutter, within reach of the user. A series of inclined mirrors 200, 201, 202, 208, 210 form successive virtual images of the user, the trajectory of the light rays being visible in the drawing. Mirror 202 is vertical and can rotate about a vertical axis XY, passing through the user's eye, and mirror 208 is carried by a horizontal arm 207 which is rotatable about the same axis, by an angle equal to twice the angle by which mirror 202 is rotated. For this purpose, the spindle 203 of mirror 202 has secured thereto a pinion 204, connected through a chain 204$^a$ to an identical pinion 205$^a$ keyed on a shaft 205, carried by arm 207. On this shaft is also keyed a pinion 205$^b$, engaging a fixed pinion 206. Willis's relation, as applied to this epicyclic gear, shows that spindle 203 rotates in the same direction as arm 207, but at half-speed.

Mirrors 208, 210 are inclined at an angle of 45°, mirror 210 being carried by a vertical arm 209 secured to arm 207.

A handle or other controlling device, which may be connected in rotation with a platform on which the user is standing, or with a seat on which he is seated, causes arm 207 to revolve and mirror 202 to rotate by half the amplitude of the rotation of arm 207. It can be seen that, for any position of said arm, mirror 202 will occupy a position normal to the line bisecting the angle formed by the rays from mirror 201 and the rays coming through mirror 208, so that in all positions, the user will see his image as it is formed by lens 1 on the film.

The user, who stands close to the treadle or knob actuating the shutter release cable, can select a pose and take a picture of himself at the proper instant, in any desired position, by depressing said treadle or knob, which may operate at the same time a magnesium lamp.

The rotation of the movable elements can be synchronized with the motion of the film, whether the pictures are taken one by one, in which case the user is free to operate the camera at any desired instant, or at normal motion picture speed, in which case the user releases the camera with the mirror in one position, the operation of the camera being automatically interrupted at the end of a given rotation of the mirror, or when the user so desires, in order to alter his pose, his facial expression, etc.

In order to enable the user to photograph himself with the head raised or lowered, fixed mirror 210 can be replaced by a rotatable mirror 212 (Fig. 3), attached to a sleeve 213, sliding along a rod 211 fixed to arm 207. The mirror is for example fixed to a lever 214, having a cam-follower 215, running in a cam-groove 216 of a guide 217 fixed to arm 207. The shape of this cam-groove is such that, for any vertical position of mirror 212, the image formed by the self-view-finder will be visible to the user, whose gaze is directed towards the mirror (212$^a$ and 212$^b$ show two further positions of the mirror).

In the arrangements above described in connection with Figs. 1 to 3, the final image which is perceived by the user is a virtual image; but the invention may be so modified as to give a real image on a screen, as shown in Fig. 4, where 210 denotes a last reflecting surface or mirror similar to mirror 210 in Fig. 1, 219 a lens located above said mirror and 220 a ground glass screen located in front of said mirror between the latter and the user, and near the focus of said lens 219. The image of the user, as given by the successive mirrors 200, 201, 202, 208, used in connection with the modification illustrated in Fig. 4, will be practically at an infinite distance from lens 219, due to the great length of the optical path from the user to said lens, whereby the refracted image given by said lens 219 will be located practically in the focal plane thereof, namely, in the plane of screen 220. Some light-tight tubular casing 221 or a bellows (as shown at 218 in Fig. 5) will preferably be provided to protect the mirror and lens from the ambient light in the cabinet in which the apparatus is arranged.

The location of lens 219 is optional, depending on its focal length and the size of the image on the screen 220. Instead of a lens, use may be made of a spherical concave mirror, forming the last reflecting surface such as 210 (Fig. 1) or 212 (Fig. 3) and forming a real image on a screen such as 220, in its focal plane.

It will be noted that, whenever a real image is formed, both the user's eyes are caused to converge onto the screen on which this image appears. If the size of the studio is such that arm 207 must be comparatively short (some decimeters), the screen may then be so close to the user as to require excessive convergence of the user's gaze, thus producing a squinting effect on the picture. This drawback may easily be avoided by placing the lens 219 and the ground-glass screen 220 at any point of the optical circuit which may be judged most suitable.

To increase the brightness of the real image, it is possible, as shown in Fig. 5, to form this image by means of an objective lens 118 on the photo-sensitive coating 115 of an electronic amplifier, which consists of a vacuum tube 114 (Fig. 5), one end of which possesses a photo-sensitive coating 115, constituting the electron-emitting cathode, and the other end a fluorescent screen 116, constituting the anode, a coil 117 being interposed between the anode and the cathode and acting as an electronic lens. This device is well known in the art and does not require a more detailed description.

In applying the above device to the invention, cathode 115 is so arranged as to receive the real image of the subject as formed by the auxiliary lens 118 and fluorescent screen 116 is arranged so as to be seen by the user.

The machinery and mirrors 201, 202, 208 can be concealed from the user's view by a partition, provided with suitable apertures and slots for allowing the passage of the reflected light rays and the rotation of arm 209 around vertical axis XY. Mirrors 208 and 210 can be mounted at the ends of a light-tight box, or else these mirrors can be mounted at the ends of a bellows 218 (Fig. 5). The lower part of said bellows may be connected to the above-mentioned electronic amplifier, as shown in Fig. 5.

The various arrangements described above can of course be combined in different ways, while still remaining within the scope of the invention.

For instance, bellows 218 of Fig. 5 may be substituted for the support 209 of Fig. 1, mirror 210 of Fig. 5 taking the place of mirror 210 of Fig. 1 and mirror 208 of Fig. 1 being attached to the upper end of said bellows. These in turn would be attached at their upper part to arm 207 of Fig. 1 in any well known manner. It is evident that if mirrors 208 and 210 are within the light-tight enclosure, box or bellows, heretofore referred to, suitable openings must be provided in the sides of said enclosure to allow on the one hand the user to see the image reflected by mirror 210, and, on the other hand, the image reflected by mirror 202 to reach mirror 208.

Wherever mirrors are used, the same can be convex or concave so as to alter the nature (whether real or virtual) of the image.

The device can of course be operated by the user by means other than the usual release or than a treadle, such as a pneumatic bulb, an electric switch, a string, etc., with mechanical, pneumatic, hydraulic, electric, etc. transmission, or, as indicated above, a coin-operated device, whereby the coin may have printed thereon the indications necessary for assisting in delivering the prints to the customer. These indications may for example be written on a small cardboard slip inserted into the coin, which is made in the shape of a small box or sheath or comprises any other suitable contrivance.

It will be understood that the invention is not limited to the above-described details of embodiment, which have been given by way of example only. Thus, the mechanisms described for controlling the angular positioning of mirrors 202 and 212 could be any other than those mentioned (such as gears, screw transmission, cables, etc.).

Besides, in order to facilitate the inspection of a real image on a ground-glass screen, which is made difficult when the user is brightly illuminated, use may be made of an infra-red source of radiation, thus providing a more or less dark lighting of the studio. In such case, the lenses and mirrors must be suitably selected in order to transmit or reflect infra-red radiations, the sensitive layer of the plate or film must be sensitized to said radiations and the ground-glass screen must be coated with a suitable fluorescent material, adapted to yield a bright image whenever energized by infra-red radiations.

Having now described my invention, what I claim as new and desire to secure by Letters Patent is:

1. In combination with a camera, a self-view-finder comprising a first reflecting surface adjacent said camera, fixed reflecting means cooperating with said first reflecting surface to direct the image of the user of said finder outside the field of the camera, a substantially vertical elongated support mounted rotatably about a vertical axis passing substantially adjacent the eyes of said user, said support having at one of its ends secondary reflecting means and at the other of its ends a last reflecting surface, said secondary reflecting means and said last reflecting surface being movable with said support and said last reflecting surface being disposed substantially opposite the eyes of said user, intermediate reflecting means on said vertical axis, said intermediate reflecting means cooperating with said first reflecting surface and with said fixed reflecting means and with said secondary reflecting means to direct the image of the user of said finder from said first reflecting surface onto said last reflecting surface.

2. A device as claimed in claim 1, in which the distance between said vertical axis and said last reflecting surface is shorter than the distance between said vertical axis and said camera.

3. In combination with a camera, a periscopic self-view-finder comprising a first reflecting surface adjacent said camera, fixed reflecting means cooperating with said first reflecting surface for directing the image of the user of said finder outside the field of the camera, a substantially vertical elongated hollow supporting conduit mounted rotatably about a vertical axis passing substantially adjacent the eyes of said user, said supporting conduit having upper reflecting means and lower reflecting means, both said upper reflecting means and said lower reflecting means being mounted internally of, and being movable with, said supporting conduit and said lower reflecting means being disposed substantially opposite the eyes of said user, intermediate reflecting means on said vertical axis, said intermediate reflecting means cooperating with said first reflecting surface and with said fixed reflecting means and with said upper reflecting means for directing the image of the user of said finder from said first reflecting surface into said lower reflecting means.

4. A device as claimed in claim 3, in which said supporting conduit is provided with extensible joints, constructed and arranged to change the vertical distance between said upper reflecting means and said lower reflecting means.

5. A device as claimed in claim 3, also comprising an optical lens unit consisting of at least one lens and disposed on the path of the reflection of the user's image between said first reflecting means and said user's eyes through said fixed reflecting means, said intermediate reflecting means, said upper reflecting means and said lower reflecting means, said optical lens unit being adapted to produce a real image of said user, and further comprising an optical surface disposed to receive the said real image.

6. In combination with a camera, a self-view-finder comprising a first reflecting surface adjacent said camera, a second reflecting surface disposed above said first reflecting surface, a vertical reflecting surface mounted for rotation around a vertical axis above the user of said finder and having its center substantially horizontally aligned with the center of said second reflecting surface, the plane of said vertical reflecting surface being on a vertical line passing substantially between the eyes of the user and said first and second reflecting surfaces being constructed and arranged to reflect the image of the user to said vertical reflecting surface, a horizontal supporting arm mounted for rotation with and about the vertical axis of said vertical reflecting surface, rotation transmitting mechanism connecting said vertical reflecting surface and said horizontal arm and constructed to rotate said vertical reflecting surface by one-half the angle of rotation of said arm and to cause said vertical reflecting surface to reflect the image received by it from said second reflecting surface substantially on a path parallel to said horizontal arm, a fourth reflecting surface carried by said horizontal arm and having its center substantially horizontally aligned with the center of said vertical reflecting surface, a last reflecting surface depending from said horizontal arm and positioned below said fourth reflecting surface and in the line of sight of the user, said fourth reflecting surface and said last reflecting surface being constructed and arranged to direct the image from said vertical reflecting surface to the eyes of the user.

7. In combination with a camera, a self-viewfinder as defined in claim 6 in which the distance between said last reflecting surface and said vertical line is shorter than the distance between said vertical line and the camera.

8. In combination with a camera, a self-viewfinder comprising a first reflecting surface adjacent said camera, fixed reflecting means cooperating with said first reflecting surface to direct the image of the user of said finder outside the field of the camera, a substantially vertical elongated support mounted rotatably about a vertical axis passing substantially adjacent the eyes of said user, said support having upper reflecting means and lower reflecting means, said upper reflecting means and said lower reflecting means being movable with said support, said lower reflecting means being also movable vertically, intermediate reflecting means on said vertical axis, said intermediate reflecting means cooperating with said first reflecting surface and with said fixed reflecting means and with said upper reflecting means for directing the image of the user of said finder toward said lower reflecting means, and means for varying the inclination of said lower reflecting means in response to vertical movements thereof to direct the image of the user toward his eyes at all vertical positions of said lower reflecting means.

9. In combination with a camera, a self-viewfinder comprising a first reflecting surface adjacent said camera, a second reflecting surface disposed above said first reflecting surface, a vertical reflecting surface mounted for rotation around a vertical axis above the user of said finder and having its center substantially horizontally aligned with the center of said second reflecting surface, the plane of said vertical reflecting surface being on a vertical line passing substantially between the eyes of the user and said first and second reflecting surfaces being constructed and arranged to reflect the image of the user to said vertical reflecting surface, a horizontal supporting arm mounted for rotation with and about the vertical axis of said vertical reflecting surface, gear mechanism connecting said vertical reflecting surface and said horizontal arm and constructed to rotate said vertical reflecting surface by one-half the angle of rotation of said arm and to cause said vertical reflecting surface to reflect the image received by it from said second reflecting surface substantially on a path parallel to said horizontal arm, a fourth reflecting surface carried by said horizontal arm and having its center substantially horizontally aligned with the center of said vertical reflecting surface, a last reflecting surface depending from said horizontal arm and positioned below said fourth reflecting surface and in the line of sight of the user, means to vary the vertical distance between said horizontal arm and said last reflecting surface, means to vary the inclination of said last reflecting surface around a horizontal axis thereof, both said last stated means and said fourth reflecting surface and said last reflecting surface being constructed and arranged to direct the image from said vertical reflecting surface to the eyes of the user at all elevations of said last reflecting surface.

10. In combination with a camera, a self-viewfinder comprising a first reflecting surface adjacent said camera, a second reflecting surface disposed above said first reflecting surface, a vertical reflecting surface mounted for rotation around a vertical axis above the user of said finder and having its center substantially horizontally aligned with the center of said second reflecting surface, the plane of said vertical reflecting surface being on a vertical line passing substantially between the eyes of the user and said first and second reflecting surfaces being constructed and arranged to reflect the image of the user to said vertical reflecting surface, a horizontal supporting arm mounted for rotation with and about the vertical axis of said vertical reflecting surface, gear mechanism connecting said vertical reflecting surface and said horizontal arm and constructed to rotate said vertical reflecting surface by one-half the angle of rotation of said arm and to cause said vertical reflecting surface to reflect the image received by it from said second reflecting surface substantially on a path parallel to said horizontal arm, a fourth reflecting surface carried by said horizontal arm and having its center substantially horizontally aligned with the center of said vertical reflecting surface, a last reflecting surface positioned below said fourth reflecting surface, a support extending downwardly from said horizontal arm, a sleeve slidably attached to said support, a swivel joint having a horizontal axis of rotation connecting said last reflecting surface and said sleeve, a secondary guide extending downwardly from said horizontal arm, a rigid link slidably engaged at one of its ends with said secondary guide, and fixedly connected at its other end with said last reflecting surface, the horizontal distance between said support and said secondary guide, at various elevations being such that the inclination of the last reflecting surface at all elevations thereof directs the image from said fourth reflecting surface to the eyes of the user.

11. A device as claimed in claim 3, also comprising an optical lens unit consisting of at least one lens and disposed on the path of the reflection of the user's image between said first reflecting means and said user's eyes through said fixed reflecting means, said intermediate reflecting means, said upper reflecting means and said lower reflecting means, said optical lens unit being adapted to produce a real image of said user, and further comprising an electronic amplifier between said optical lens unit and the eyes of the user and disposed to receive the said real image.

12. In combination with a camera, a periscopic self-view-finder, comprising a first reflecting surface adjacent said camera, fixed reflecting means cooperating with said first reflecting surface to direct the image of the user of said finder outside the field of the camera, a substantially vertical elongated periscopic support mounted rotatably about a vertical axis passing substantially adjacent the eyes of said user, said periscopic support having at one of its ends secondary reflecting means and at the other of its ends a last reflecting surface, said secondary reflecting means and said last reflecting surface being movable with said periscopic support and said last-reflecting surface being disposed substantially opposite the eyes of said user, intermediate reflecting means on said vertical axis, a rotation transmitting mechanism associated with said intermediate reflecting means and with said periscopic support and constructed and arranged to transmit to said intermediate reflecting means an angular rotation equal to one-half of the angular rotation of said periscopic support, said intermediate reflecting means cooperating with said first reflecting surface and with said fixed reflecting means and with said secondary reflecting means to direct the image of the user of said finder from said first reflecting surface into said last reflecting surface in all angular positions of said support about said vertical axis.

JEAN MICHEL PAILLAIS,
ALIAS FOUFOUNIS.

REFERENCES CITED

The following references are of record in the file of this patent:

UNITED STATES PATENTS

| Number | Name | Date |
|---|---|---|
| 760,545 | Miller | May 24, 1904 |
| 877,283 | Barrath | Jan. 21, 1908 |
| 1,709,598 | Simjian | Apr. 16, 1929 |
| 1,794,142 | Boston | Feb. 24, 1931 |
| 1,830,770 | Simjian | Nov. 10, 1931 |
| 1,893,211 | Simjian | Jan. 3, 1933 |
| 1,897,772 | Simjian | Feb. 14, 1933 |
| 1,919,642 | Simjian | July 25, 1933 |
| 1,926,657 | Simjian | Sept. 12, 1933 |
| 1,928,677 | Simjian | Oct. 3, 1933 |
| 2,051,608 | Kean | Aug. 18, 1936 |
| 2,105,557 | Slack | Jan. 18, 1938 |
| 2,161,262 | Simjian | June 6, 1939 |
| 2,218,302 | Simjian | Oct. 15, 1940 |
| 2,224,579 | Wheelan | Dec. 10, 1940 |